Jan. 5, 1965    L. F. SCHATZL ETAL    3,164,275
COMBINED CAMPER LIFT AND COUPLING
Filed July 18, 1963    2 Sheets-Sheet 1

INVENTORS:
LEOPOLD F. SCHATZL
HARRY R. RIGGS
BY
M A Gray
AGENT

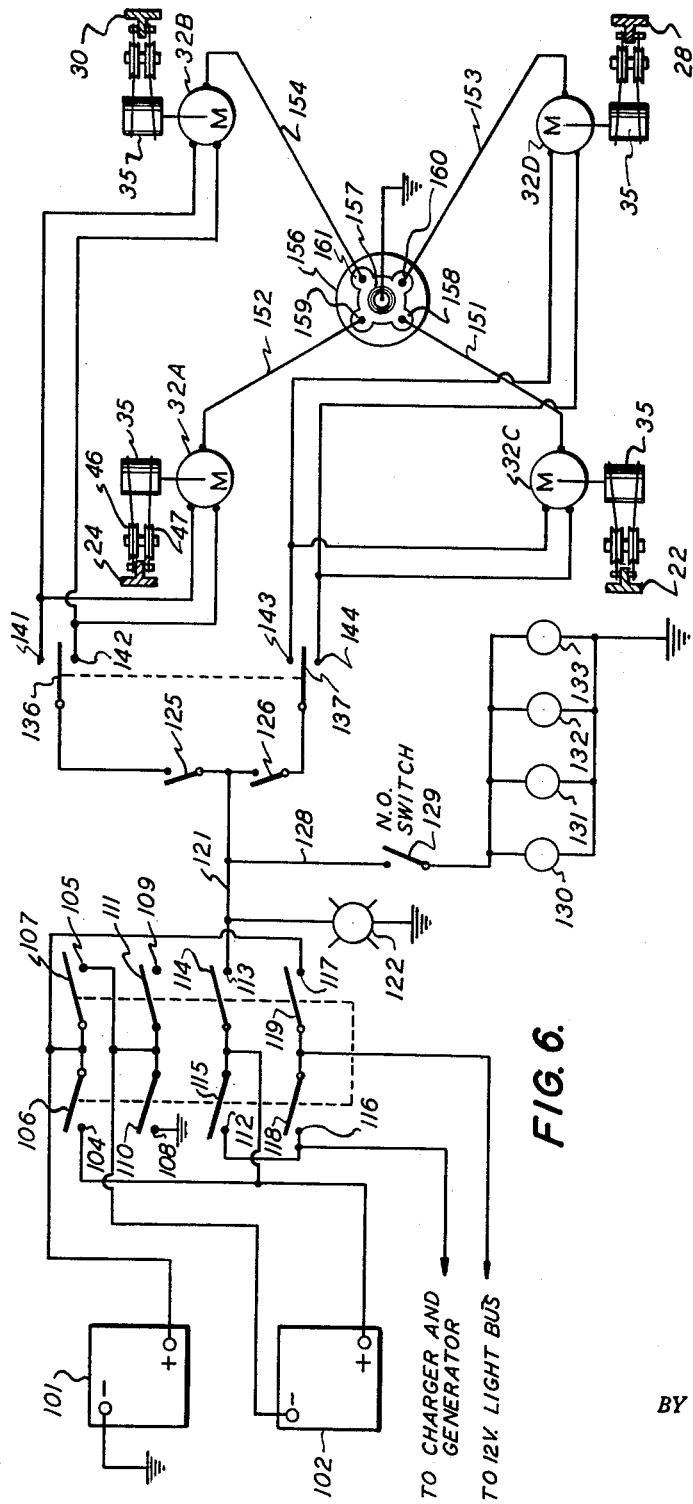

United States Patent Office 3,164,275
Patented Jan. 5, 1965

3,164,275
COMBINED CAMPER LIFT AND COUPLING
Leopold F. Schatzl, 704 E. Granada Court, and Harry R. Riggs, 744 E. "I" St., both of Ontario, Calif.
Filed July 18, 1963, Ser. No. 295,891
2 Claims. (Cl. 214—515)

This invention relates to a combined camper lift and coupling therefor, with provision for a convenient means of disconnecting the camper body from the tractor frame, raising the same high enough to allow removal of the tractor and yet leaving the said camper body supported in a level condition.

The primary object of the invention is to provide a convenient and economical means of parking a camper body unit, disconnecting the same from the tractor portion and leaving the said camper body unit in a level condition.

Another object of the invention is the adaption of the supporting and leveling means thereof to the conventional type of travel trailer where it is used to stabilize the same, whether it is hitched to a tractor or not.

Another object of the invention is the provision of a convenient means of quickly connecting or disconnecting the camper body from the tractor frame.

A further object of the invention is the provision of an assembly which will result in either automatic or manual control of the several lift units.

Another feature of the invention resides in the fact that the means of powering the lift units or the camper body connecting members may be readily adapted to various forms such as electric, hydraulic, pneumatic, or manually operated, to meet the manufacturing requirements of various models.

Furthermore it is pointed out that while four lift members have been illustrated in the drawings, the number of lift units may be varied to meet differing load conditions, as required.

Other objects and advantages of the invention will be found in the description, the drawings, and in the claims; and for complete understanding of the invention, reference may be had to the following detailed description and the accompanying drawings, wherein:

FIG. 1 is a side elevational view of a samper body and tractor of our invention in coupled condition, and with the lift units as they appear when lowered, but previous to lifting the said camper body;

FIG. 2 is a fragmentary rear elevational view of FIG. 1, a portion thereof being broken away and vertically sectioned to show certain details of the lift assembly and the coupling members;

FIG. 3 is a horizontal fragmentary section through the rear portion of FIG. 2, and taken at a point just below the camper body floor;

FIG. 4 is a somewhat enlarged transverse vertical sectional view of the solenoid connecting unit shown on the right side of FIG. 2;

FIG. 5 is a side elevational view of FIG. 4 and partly in section, the release position of the coupling hook being shown in dotted lines;

FIG. 6 is a schematic layout of the electric system used in the automatic operation of the lift units.

Referring first more particularly to FIGS. 1–5 in the drawings, the numeral 10 represents a tractor coupled to a camper body 12, having a conventional overhanging portion 14, and enclosed rear wall 16, side wall 17, a reentrant portion 15 and downwardly extendable lift legs 22 and 28, arranged at the forward and rear ends 15 and 16 of the camper body.

By reference to FIGS. 2–5 the lifting operation will be described in detail. The cutaway section in FIG. 2 shows the rear lift assembly, the operation of which will be described; the forward unit being the same. Previous to the lifting operation the two corresponding solenoid fastener units which are attached to the underside of the bottom 42 of the camper body, at each forward corner thereof, are released. The solenoid unit shown in detail by FIGS. 4 and 5 is held securely in place by flange 67 which depends from and is fastened to the bottom 42 of the camper body, the said flange 67 being reinforced by webs 68 and 69. The angular opening 71, 72 of flange 67 is fitted over pin 65 which in turn is secured to the side of the truck frame or chassis 39 which includes the usual cross braces 41, only one of which is shown in FIG. 2. A hook 76–78 is engaged with pin 65 and fitted thereunder, being held in closed position by tension spring 92, one end of which is anchored to 92–A which is secured to flange 67, while the other end is attached to pin 91, the inner end of which is connected to the body portion 76 of the said hook 76–78 and the outer end thereof being positioned in slot 90 of the solenoid operated arm 89. Each solenoid unit is housed in a casing 86 which is secured to flange 67 by bolts 82 and 83. The releasing of the camper body from the truck frame is accomplished when each solenoid unit is actuated by switch 129 as indicated in FIG. 6, which rotates the solenoid arm 89 to the dotted line position illustrated by FIG. 5 at 89' by moving pin 91 which is positioned in slot 90 at the outer end thereof, and carrying with it the hook 76, 78 to which it is attached.

The power unit, shown in detail by FIG. 3, controls the raising and lowering of the two rear lifting legs 22–24, it being understood that a corresponding power unit is also provided for control of the two front lifting legs 28. Each power unit is suitably supported, as at 31, by brackets 30 from the underside 42 of the camper body between the lifting legs 22–24, and comprises a 24 volt D.C. motor 32 with built-in reversible brake and high-low limit switch 34, a gear unit 33, and a drum 35. The said drum is divided into sections 35–A and 35–B by an annular spacer flange 37. A pair of cables is reversely wound around the drum 35 on either side of spacer element 37. Cable 55 is wound on the drum section 35–B in an anti-clockwise direction and passing under pulley 44, thence to the upper end of leg member 22 at which point it is secured to pin 61 shown in dotted lines FIG. 2. Cable 54 from its point of attachment on section 35–B of the drum is wound therearound in a clockwise direction and passing over pulley 45, thence to the lower end of leg 22 to which it is secured to pin 61', see FIG. 3.

From its point of attachment on section 35–A of drum 35 cable 57 is wound onto drum section 35–A in an anti-clockwise direction and passing under pulley 46 thence to the upper end of leg 24 at which point it is secured to pin 61. Cable 58 being wound on drum section 35–A in a clockwise direction, passing over pulley 47, thence to the lower end of leg 24 to which it is secured to pin 61'. It is noted that the relation of the cables in the latter arrangement is crossed over in order to attain the same direction of lift as the cables on drum section 35–B.

It will be noted that each of the lifting legs is slidably housed within vertically disposed channels 21 and 23 which are arranged on the inside of the camper body and are suitably secured to the inner side walls thereof. To effect a snug but slidable fit therebetween, each lifting leg, as best shown in FIG. 3, is of substantially T shape angle configuration, with the flat outer face thereof engaging the outer wall of the channel and being held in abutting relationship therewith by angle members 21–22 and 23A–23B, suitably secured to the side walls of each channel on either side of the inwardly projecting tongue of the T angle leg. Thus, each leg will be received within and will be adapted to vertically move from its channel.

The lift pulleys 44, 45, 46 and 47 are mounted on bearing flanges 51 and 52 which are secured to the lower inner edges of said channels 21 and 23 so that the pairs of pulleys will oppose each other, as shown in FIGS. 2 and 3.

The lifting operation, therefore, proceeds by actuating switch 129, and by means of the solenoids releasing the engaging hooks 76 from the pins 65. The power is then applied to the motor units 32, turning drums 35 and by clockwise movement thereof putting tension on cables 55 and 57 while cables 54 and 58 unwind in the opposite direction, thereby resulting in a lifting action of the camper body.

While the rear unit has been shown and described thus far in the specification, it is to be understood that the forward unit corresponds thereto and operates in the same manner.

It is obvious that various changes in the arrangement and number of the lift units may be varied as needed to adapt the present invention to the particular specifications and requirements of camper models presented to the market.

The lift assembly described above is adapted to operation of the lift units separately or by simultaneous action, but is not designated to lift the camper body in such a manner as to remain level during the lifting operation.

An important feature of a modified form of the above described lift mechanism of the invention automatically maintains a level condition during the entire lift operation, and will be described in detail as follows:

By reference to FIG. 6 of the drawing showing a schematic layout of the lift units and electric wiring diagram it will be seen that the electric power is distributed to the reversible motors M through a mercury leveling switch 156 which is also suitably supported beneath and in a position parallel to the camper body floor at approximately a center point relative to the four lifting units 22–28. The electric cables 151, 152, 153 and 154 are connected to contacts 158, 159, 160 and 161 respectively of the mercury switch 156. The ground to the mercury switch is insulated from contact source by 157, so that the power is delivered to the motor only when the mercury is contacting the swtich elements 158–161. Although four lift units have been shown, it is obvious that the number of units may be increased without departing from the spirit of our invention.

The power supply indicated in FIG. 6 is illustrative only and may be furnished by any of the conventional means employed in portable units. In the present case 24 volts are provided at 121 by using the two twelve volt batteries 101 and 102 in series by closing switch 107–105 and 114–113. Switches 125 and 126 are closed and switch contacts 136–141 and 137–143 are closed for lifting operation and contacts of 136–142, as well as 137–144 results in a lowering operation. In the event only one end is to be operated either 125 or 126 may be closed, however the completely automatic lift operation requires closure of both 125 and 126.

It is noted that the "normally open" switch 129 controls the bank of solenoid units. A 24 volt ready indicator designated is by 122.

For convenience, in the present circuit layout, provision is made for charging the batteries in parallel and the operation of the lighting system need not be interrupted.

At this point it should be stressed that the lift means of this invention, whether automatic or not, may be adapted to the conventional type of trailer as above indicated. This is accomplished by raising the trailer body until the weight thereof is removed from the springs, and is especially useful in preventing swaying due to wind pressure exerted upon the said trailer.

It is obvious that while we have shown and described specific embodiments of our invention, we wish it to be understood that modifications may be made without departing from the spirit of our invention, and that we intend therefore to be limited only by the scope of the appended claims.

We claim:

1. In combination, a vehicle comprising a chassis, a camper body supported rearwardly of said chassis and adapted to be detachable therefrom, latching bolts on said trailer, pivotal latching hooks arranged at the forward end of said camper body, solenoid actuated means for pivoting said hooks into latching engagement with said bolts for locking said body on said chassis, means to operate said solenoid actuated means, vertically disposed substantially rectangular channel members at each corner of said body, vertically disposed substantially rectangular T-shaped lifting legs slidably arranged in said members, said legs having flat outer surfaces thereon flatly engageable with said channel members, and guide means in said members engageable with said lifting legs for guiding said legs relative to said members, reversible cable drums on the underside of said body, power means for rotating said drums, pulleys mounted on each of said channel members, cables connected to each leg and its respective drum, the cables for each leg being trained over the respective pulleys and connected to the upper and lower ends of the respective legs, said cables being wound in opposite directions on the respective drums, means for controlling said power means, and said drum, whereby said camper body may be vertically raised relative thereto whereupon the vehicle is driven away from the self-supported body.

2. In combination, a vehicle comprising a chassis, a camper body supported rearwardly of said chassis and adapted to be detachable therefrom, latching bolts on said trailer, pivotal latching hooks arranged at the forward end of said camper body, solenoid actuated means for pivoting said hooks into latching engagement with said bolts for locking said body on said chassis, means to operate said solenoid actuated means, vertically disposed substantially rectangular channel members at each corner of said body, substantially T-shaped lifting legs slidably arranged in said members, said legs having flat outer surfaces thereon flatly engageable with said channel members, and guide means in said members engageable with said lifting legs for guiding said legs relative to said members, reversible cable drums on the underside of said body, one for each leg, power means for rotating said drums, pulleys mounted on each of said channel members, cables connected to each leg and its respective drum, the cables for each leg being trained over the respective pulleys and connected to the upper and lower ends of the respective legs, said cables being wound in opposite directions on the respective drums, a leveling mercury switch mounted on the bottom of said body, said switch controlling said power means, and said drums, whereby said camper body may be vertically raised relative thereto, and simultaneously maintained in a level position whereupon the vehicle is driven away from the self-supported body.

References Cited by the Examiner

UNITED STATES PATENTS

| | | | |
|---|---|---|---|
| 1,303,854 | 5/19 | Clark | 214—515 |
| 2,084,941 | 6/37 | Capello | 254—86 |
| 2,359,961 | 10/44 | Anthony | 214—38.22 X |
| 2,916,319 | 12/59 | Du Bois | 296—76 |
| 2,948,561 | 8/60 | Eatinger | 180—82.2 X |
| 2,985,482 | 5/61 | Lion | 214—515 |
| 3,002,760 | 10/61 | Lee | 214—515 X |
| 3,069,141 | 12/62 | Broussard | 254—185 |

HUGO O. SCHULZ, *Primary Examiner.*

GERALD M. FORLENZA, *Examiner.*